United States Patent [19]

van der Lely

[11] 4,362,340

[45] Dec. 7, 1982

[54] TRACKED VEHICLES

[76] Inventor: Cornelis van der Lely, 7, Brüschenrain, Zug, Switzerland

[21] Appl. No.: 210,020

[22] Filed: Nov. 24, 1980

Related U.S. Application Data

[63] Continuation of Ser. No. 895,024, Apr. 10, 1978, abandoned.

[30] Foreign Application Priority Data

Apr. 15, 1977 [NL] Netherlands .......................... 7704127
Apr. 15, 1977 [NL] Netherlands .......................... 7704128

[51] Int. Cl.$^3$ ........................ B62D 55/24; B62D 55/04
[52] U.S. Cl. ................................. 305/31; 305/35 EB; 254/86 H; 180/9.2 C
[58] Field of Search ................. 254/86 H; 305/10, 31, 305/32, 35 EB, 36, 54, 56, 37; 180/9.2 C, 9.42, 9.26

[56] References Cited

U.S. PATENT DOCUMENTS

| | | | |
|---|---|---|---|
| 1,689,536 | 8/1927 | Saives ............................. | 305/35 EB |
| 2,402,042 | 6/1946 | Haushalter ....................... | 305/37 |
| 2,571,067 | 10/1951 | Seckendorf .................. | 254/86 H X |
| 3,509,956 | 5/1970 | Dufresne .......................... | 305/56 X |
| 3,511,327 | 5/1970 | Schlor ............................ | 305/10 X |
| 3,844,582 | 10/1974 | Cook ........................... | 254/86 H X |

FOREIGN PATENT DOCUMENTS

| | | | |
|---|---|---|---|
| 2509704 | 9/1976 | Fed. Rep. of Germany ... | 254/86 H |
| 1216756 | 4/1960 | France . | |
| 7605810 | 11/1977 | Netherlands ................... | 305/35 EB |
| 278779 | 10/1927 | United Kingdom .......... | 305/35 EB |
| 1093802 | 12/1967 | United Kingdom ................. | 305/10 |

Primary Examiner—David A. Scherbel
Attorney, Agent, or Firm—Penrose Lucas Albright

[57] ABSTRACT

A standard model truck or trailer having a rear load bearing axle with two side-by-side pneumatic tires mounted on wheels at both ends of the axle is provided. A further set of like side-by-side rear wheels with pneumatic tires are connected to the vehicle's main frame by depending carriers pivoted thereto. The rear wheels are rearwardly biased by a compression spring and may be selectively moved forwardly or rearwardly in an arc about their pivotable connection by a hydraulic piston and cylinder arrangement. An endless tread-type track can be mounted around the succeeding pairs of tires on either side. Each track has two or more parts dovetailed at the ends held together by a spring steel rod inserted in openings therethrough, each opening being defined by a polygonal tube which receives the rod whereby it cannot rotate. The rod is maintained in place by a detent member. A slightly curved plate, rectangular as seen in plan, pivoted from supports depending from frame forward of at least the rearmost wheels, extends rearwardly centrally between the wheels to where a hydraulic cylinder and piston assembly connects it to the frame to lift the wheels simultaneously for installing the tracks. They are installed by decreasing the distance between the wheels through the hydraulic arrangement and, when in place, by releasing pressure in the connected hydraulic piston and cylinder assembly whereby the compression spring tensions the wheels against them.

27 Claims, 9 Drawing Figures

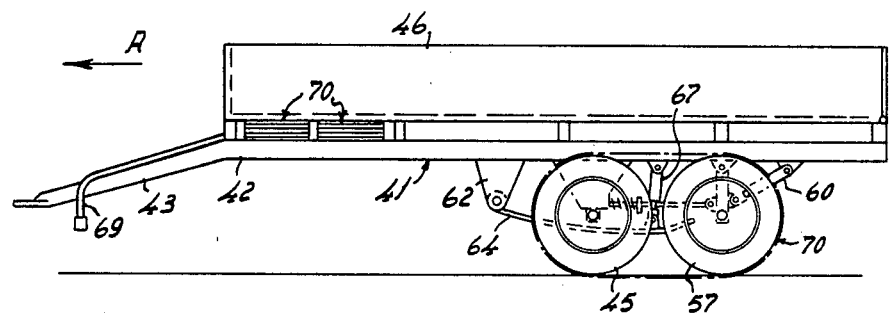
FIG. 6
FIG. 7
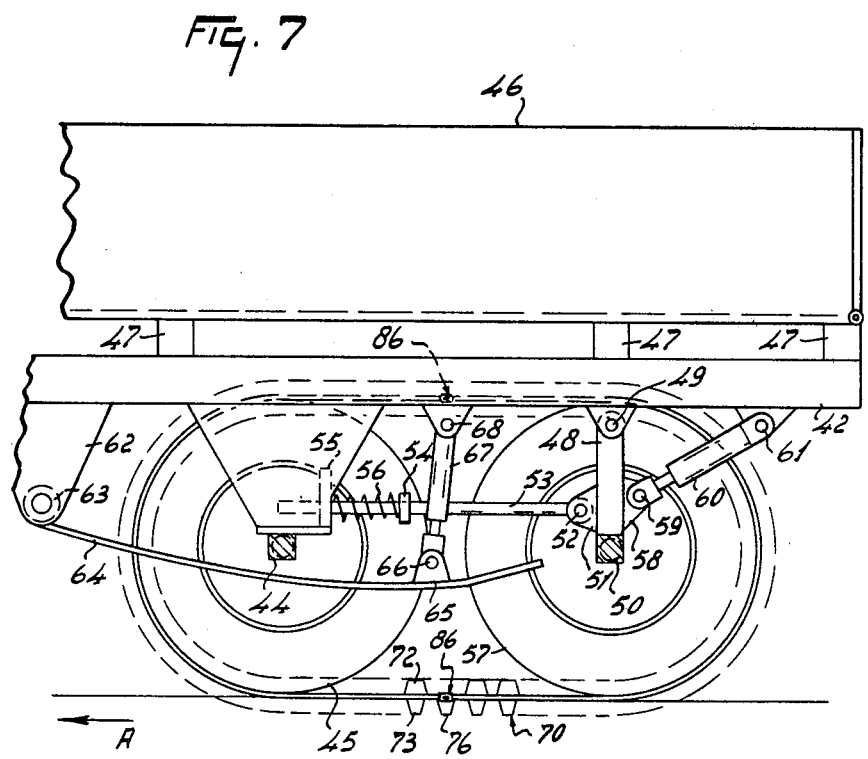

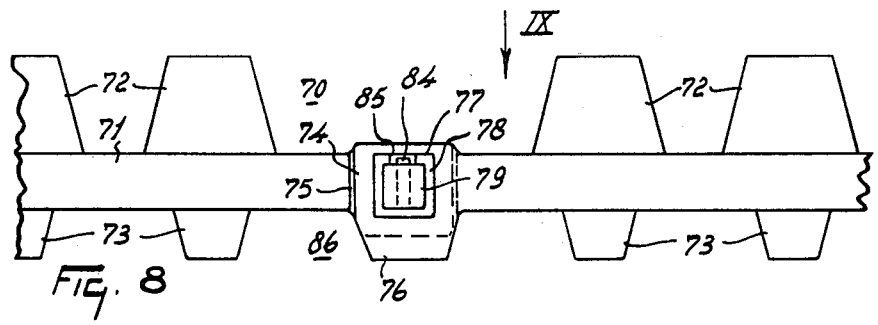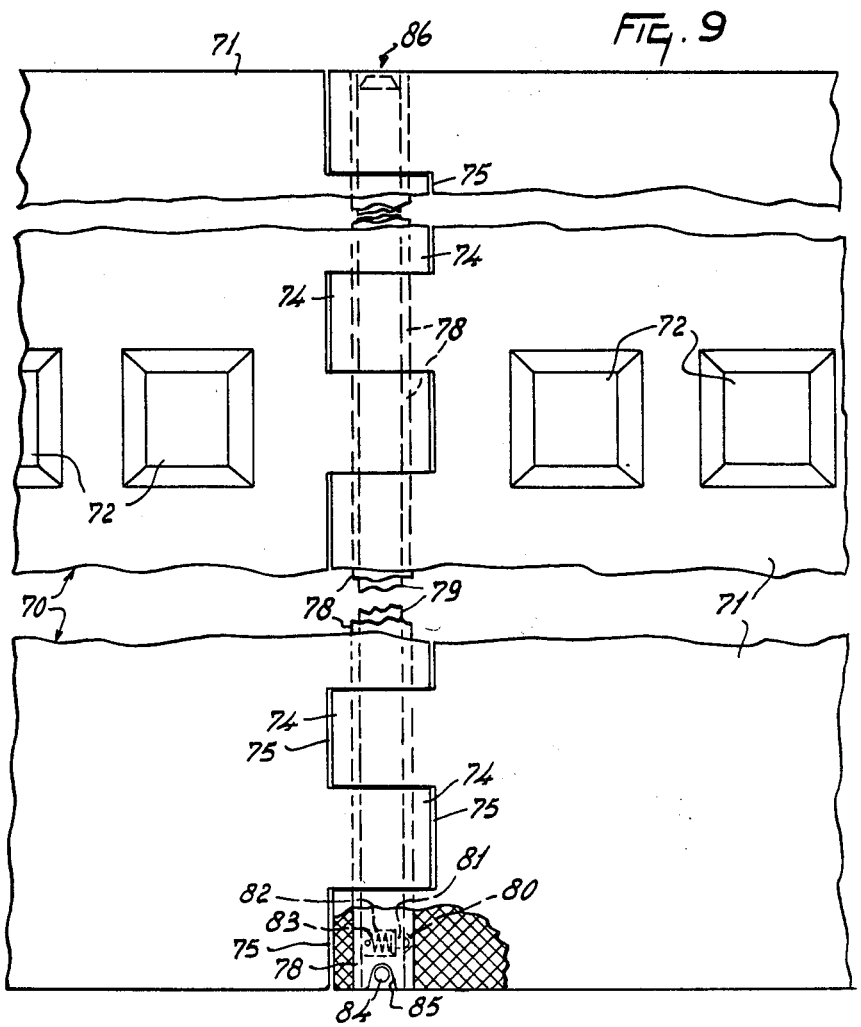

TRACKED VEHICLES

RELATED APPLICATION

This is a continuation of Ser. No. 895,024, filed Apr. 10, 1978 now abandoned.

SUMMARY OF THE INVENTION

The invention relates to vehicles, such as for example, tractors, trucks, cars, vehicular soil cultivating machines or the like, of the kind which include at least one endless tread type track arranged around wheels of the vehicle.

An object of the invention is to provide an endless tread type track that can readily be arranged on, or removed from, a vehicle, its rate of wear being low and its lifetime being long.

According to one aspect of the invention the track consists at least partly of flexible material and has at least one joint by which end parts of the track are substantially rigidly interconnected at the joint, the track being provided with extensions positioned to come into contact with the ground during operation of the vehicle.

For a better understanding of the invention, and to show how the same may be carried into effect, reference will be made, by way of example, to the accompanying drawings, in which:

BRIEF DESCRIPTION OF THE DRAWINGS

FIG. 6 is a side elevation of a towable wagon to which the invention is applied;

FIG. 7 is a side elevation, to an enlarged scale, of part of the wagon of FIG. 6, the wheels located one side of the wagon being omitted;

FIG. 8 is a side elevation of part of an endless track or crawler according to the invention employed on the vehicles shown in FIGS. 1 to 7; and FIG. 9 is a plan view as seen in the direction of an arrow IX in FIG. 8.

DESCRIPTION OF THE PREFERRED EMBODIMENTS

Figure 1:
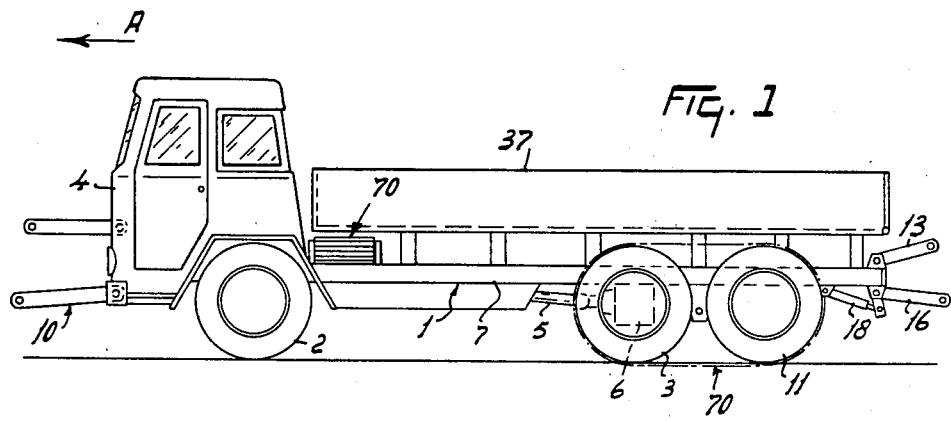
FIG. 1 is a side elevation of a motor-truck to which the invention is applied.
Figure 2:
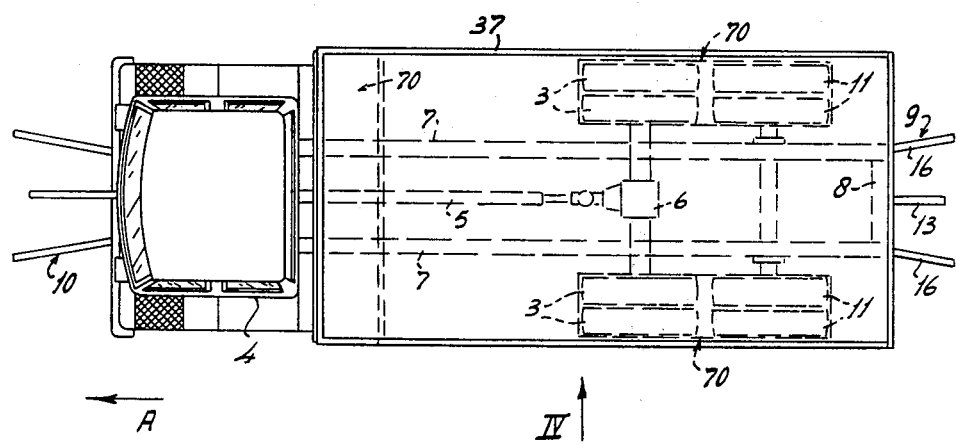
FIG. 2 is a plan view of the motor-truck shown in FIG. 1.

The motor-truck shown in FIGS. 1 to 5 is a mass-produced truck (hereinafter termed standard truck). In the factory this truck is provided with a frame 1 supported by steerable front wheels 2 and driven rear wheels 3, while at each side of the frame 1, two of the wheels 3 are arranged on a rear axle of the truck. At the front of the frame 1 a driver cabin 4 and a driving engine located inside the cabin 4 are provided. By means of an auxiliary shaft 5 and a differential 6 the rear wheels 3 on the rear axle are driven in known manner by the engine. The frame 1 comprises, as usual, two parallel frame beams 7 arranged symmetrically to a longitudinally extending vertical plane of substantial symmetry of the truck, said beams 7 extending, as required, over the substantially whole length of the truck. The frame beams 7 are interconnected at their rear ends by a transverse beam 8 (FIGS. 2 and 3) rigidly secured to the former. A similar transverse beam is also secured to the front ends of the frame beams 7.

Figure 4:
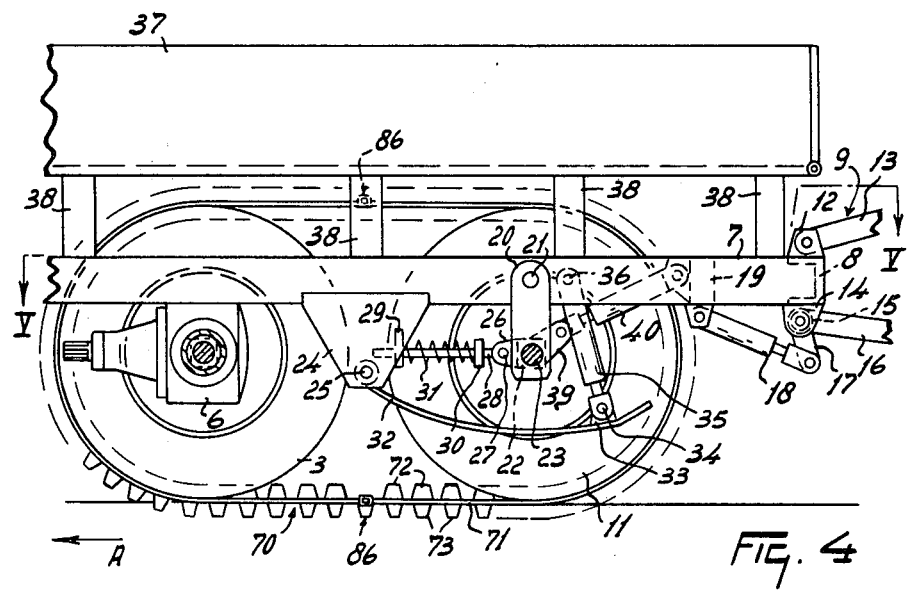
FIG. 4 is a side elevation, to an enlarged scale, of part of the truck shown in FIGS. 1 to 3 as seen in the direction of an arrow IV in FIG. 2, the wheels located at one side of the track being omitted.
Figure 5:
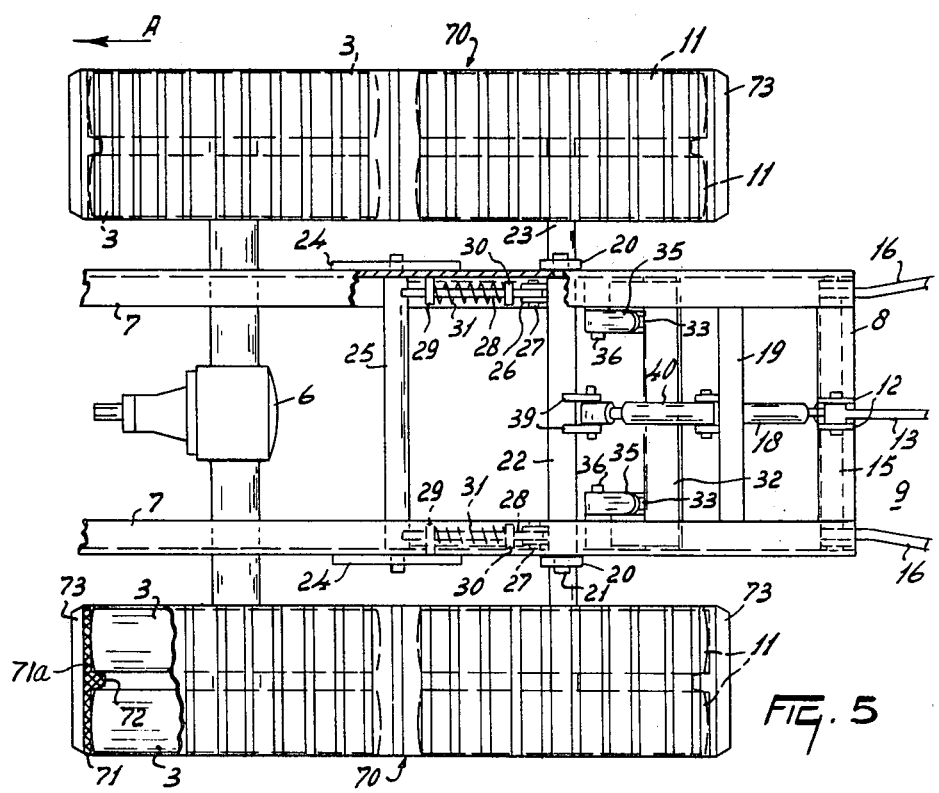
FIG. 5 is a partially broken sectional plan view taken on the line V—V in FIG. 4.

In order to adapt this comparatively inexpensive mass-produced truck to agricultural purposes, the standard truck is provided with a rear lift 9, a front lift 10 and with a non-driven second set of rear wheels 11. For this purpose a pair of ears 12 are welded to the top of the transverse beam 8 (FIG. 4), said ears holding a pivotal shaft about which a top arm 13 of the lift 9 is freely pivotable. Near the rear end of each of the frame beams 7, a pair of ears 14 are welded to the bottom of said beams, in which ears 14 a pipe 15, covering the whole width of the frame 1, is pivotally journalled. Near each of the ends of the pipe 15 is welded a lower lifting arm 16 of the lift 9. Midway along the length of the pipe 15, a downwardly extending arm 17 is rigidly secured to said pipe 15, the end of the arm 17 remote from the pipe 15 carrying a pivotal shaft to which is pivoted the piston rod of a hydraulic cylinder 18. The hydraulic cylinder 18 itself is pivoted to a transverse beam 19 arranged in front of the transverse beam 8, considered in the intended direction of forward travel A of the truck. The hydraulic cylinder 18 is inclined, in a central position, from the transverse beam 19 in a downward and rearward direction towards the arm 17 (FIGS. 4 and 5).

In order to fasten the additional sets of rear wheels 11, located behind the rear wheels 3, each of the two frame beams 7 is provided with a carrier 20 (FIGS. 4 and 5), which is pivoted to the frame beam 7 concerned by means of a horizontal pivotal shaft 21 extending transversely of the direction of travel A. Each carrier 20 extends downwards from the beam 7. The end of each carrier 20 remote from the pivotal shaft 21 is provided with a clamping piece 22. A shaft 23 is passed through the two clamping pieces 22 and through holes provided in the carriers 20 and extends beyond the outside of the carrier 20. The shaft 23 is rigidly secured to the carriers 20 by the clamping pieces 22. Near each of the two ends of the shaft 23, the pair of additional rear wheels 11 is secured so that each of these rear wheels is in line with and behind a corresponding rear wheel 3, considered in the direction of forward travel A.

At an area located, in side elevation, between the differential 6 and the carrier 20, the bottom of each frame beam 7 has welded to it a downwardly extending, generally triangular plate-shaped carrier 24. The lower ends of the two carriers 24 hold a pivotable pipe 25 extending horizontally perpendicular to the direction of travel A.

Each of the two clamping pieces 22 secured to the carriers 20 is provided with a pair of forwardly protruding ears 26 holding a pivotal shaft 27, about which the rear end of a rod 28 is pivotable. Each rod 28 extends to the front from the associated ears and is provided at a given distance from its foremost end with a plate 29 extending perpendicularly to the rod 28 and being welded to the inner side of the neighboring carrier 24. Each plate 29 has a hole for receiving associated rod 28 so that the rod 28 can slide through the plate 29. Near the ears 26, each rod 28 is provided with a plate 30 also extending perpendicular to the rod 28, which rod is also passed through a hole in the plate 30. However, the rod 28 is immovably secured in place with respect to the plate 30. The rod 28 is surrounded by a helical compression spring 31, the ends of which engage the plates 29 and 30. The free end of each rod 28 is provided with a stop (not shown), which prevents the rod 28 from slipping out of the plate 29.

The pipe 25, which is pivotable with respect to the carriers 24, has welded to it over its whole length one edge of a rigid pressure plate 32 extending rearwardly from the pipe 25 and, in the position shown in FIG. 4, slightly downward, considered in the direction of forward travel A. In the elevation of FIG. 4, the rear edge of the pressure plate 32 has a rim which is bent slightly upwards with respect to the front part joining the pipe 25. Near the front of said rear rim, ears 33 are secured to the top of the pressure plate 32 near each of its two side edges for holding a horizontal pivotal shaft 34 extending perpendicular to the direction A and having pivoted to it the end of the piston rod of a hydraulic cylinder 35. Each of the two cylinders 35 is pivoted, near its end remote from the pivotal shaft 34, to a pivotal shaft 36 which also extends horizontally perpendicular to the direction A and which is supported by the neighboring frame beam 7. Viewed in plan, the pressure plate 32 has a rectangular periphery, the width of which, measured perpendicular to the direction A, is approximately equal to the distance between the outer sides of the frame beams 7, whereas the length of the pressure plate 32, measured from the pivotal shaft 25 to its rear edge, is approximately equal to the diameter of one of the rear wheels 3 or 11. In the elevational view of FIG. 4, the pivotal axis of the pipe 25 is located approximately at the level of the foremost point of the non-drivable rear wheels 11, whereas the rear edge of the pressure plate 32 is located at the hindmost point thereof.

The truck may furthermore be provided with a loading platform 37, which may be disposed, if desired, on the frame 1 by means of supports 38 so that the bottom of the leading platform 37 is located at a distance above the tops of the frame beams 7. The loading platform 37, or a loading trough, is preferably releasably fastened to the frame 1.

Each of the two clamping pieces 22 is provided with rearwardly and upwardly inclined ears 39 holding a horizontal, transverse pivotal shaft about which the piston rod of a hydraulic cylinder 40 is arranged to pivot. The cylinder 40 itself is turnably connected to the transverse beam 19, located behind the pivotal shaft 21, by means of a pivotal shaft extending parallel to the former.

The truck is provided in known manner with an oil or other fluid pressure medium pump (not shown), which can be driven by the engine of the truck and with a hydraulic system communicating with the aforesaid hydraulic cylinders or arms. The hydraulic system can be controlled from the driver cabin 4.

The invention may furthermore be applied to mass-produced wagons (FIGS. 6 and 7) for example, towed trailers or lorries. The wagon comprises a frame 41 having two parallel, relatively spaced frame beams 42 extending in the direction A and being interconnected at the front and rear ends by transverse beams. At the front, the frame beams 42 are provided with a drawbar 43 for attaching the wagon to a truck or to a tractor. The wagon comprises an axle 44 having on each side of the frame 41 two ground wheels 45. The wagon may be provided with a loading platform 46, which can be releasably connected by means of supports 47 to the top of the frame 41. By means of carriers 48 extending downwards from the frame 41 and being pivoted to said frame 41 by horizontal pivotal shafts 49 extending perpendicular to the direction A, an additional axle 50 is arranged behind the axle 44 and parallel to the latter. The two carriers 48 again have forwardly extending ears 51 provided with rods 53 arranged to pivot about shafts 52 extending perpendicular of the direction A, said rods 53 extending forwardly from the carriers 48. The rods 53 are each provided with plates 54 each embracing the associated rod and being rigidly secured thereto, and with plates 55 located at a distance in front of the plates 54 and being secured to carriers supporting the axle 44, the plates 55 being installed in the factory. The rods 53 are slidable through holes in the plates 55. The portion of each rod 53 which is located between the plates 54 and 55 is surrounded by a helical compression spring 56 which engages the plates 54 and 55. The free end of each rod 53 is provided with a stop (not shown) which prevents the rod 53 from slipping out of the plate 55.

The additional axle 50 has, at each side of the frame, two tired wheels 57 disposed so that, considered in the direction A, one wheel of each set of two wheels 57 at one side of the frame is in line behind a wheel of the pair of ground wheels 45 located at the same side. The smallest distance between the wheels 45 and 57 is about ten centimeters (four inches) and the overall diameter of each of the wheels 45 and 57 is about one meter (39½ inches).

Each of the carriers 48 is provided at its rear with ears 58 holding a horizontal pivotal shaft 59 extending perpendicular to the direction of movement A and having pivoted to it, on each side of the frame 41, the piston rod of a corresponding hydraulic cylinder 60. The hydraulic cylinders 60 themselves are pivoted to the bottoms of the frame beams 42 by pivotal shafts 61 extending parallel to the pivotal shafts 59. The hydraulic cylinders 60 are inclined rearwardly and upwardly from the associated ears 58.

At an area located in front of the standard ground wheels 45, supports 62 are provided on the bottom of the two frame beams 42, said supports 62 being provided near their bottoms with bearings in which a horizontal pipe 63 extending perpendicular to the direction A is arranged to pivot. The pipe 63 covers the whole width between the frame beams 42. The pipe 63 has rigidly secured to it a pressure plate 64 extending, in the position shown in FIG. 7, from the pipe 63 to the rear and in a slightly inclined position beneath the axle 44. The plate 64 has a slightly bent up rear edge. The pressure plate 64, like the pressure plate 32, may be provided with profiles extending in, or transversely of the direction A for reinforcing the plate in a direction at right angles to its plane. Viewed in plan, the plate 64 has a rectangular shape like the plate 32. The front edge of the plate 64 is located in front of the standard wheels 45 whereas the rear edge of the plate, in the position thereof shown in FIG. 7 and in the side elevation of that Figure, lies midway between the front point of the wheels 57 and the axle 50. Near each of the two longitudinal edges of the plate 64, it is provided with ears 65 located at a distance behind the pipe 63 and near the front of said rear edge. The ears 65 hold a horizontal pivotal shafts 66 extending perpendicular to the direction A and having pivoted to them the piston rods of corresponding hydraulic cylinders 67. Each of the cylinders 67 itself is pivoted at its end remote from the pivotal shaft 66 to a corresponding one of the frame beams 42 by a pivotal shaft 68 that is parallel to the pivotal shafts 66. Viewed in plan, the pivotal shafts 68 are located midway between the ground wheels 45 and 57. The wagon comprises a plurality of hydraulic connections 69 (FIG. 6), by which the cylinders 60 and 67 can be coupled with the hydraulic system of the tractor or other vehicular prime mover. These cylinders 60 and 67 can thus be actuated from the driver seat of the prime mover.

In order to adapt the truck of the first embodiment and the wagon of the second embodiment to agricultural purposes and particularly to travel with heavy loads on weak soil, the pairs of tires wheels 3 and 11 (in the first embodiment) and the pairs of tires wheels 45 and 57 (in the second embodiment), said pairs being provided on both sides of the vehicle concerned, can be provided with an endless tread type track 70 (FIGS. 8 and 9) of flexible material, for example, synthetic resin or rubber-like material, if desired, provided with one or more nylon or canvas liners. The term "flexible type track" is to be understood to mean an endless tread type track or a crawler whose material is flexible and which does not include relatively pivotable parts.

The caterpillar tracks arranged around said sets of wheels each comprise, in this embodiment, two halves interconnected so as not to be pivotable in a horizontal sense. Tracks 70 may, of course, be composed in an analogous manner of more than two parts, but alternatively of a single part, the two ends of which latter can be fastened to one another.

The or each track part comprises an elongated belt 71 of the aforesaid material having a thickness of at least ten millimeters (4/10 of an inch), preferably about twenty-five millimeters (one inch), while the width measured in the installed state parallel to the wheel axles matches the overall width of the tires of the two neighboring wheels 3, 11, 45, 57. This width of the belt 71 amounts to about five hundred millimeters (197/10 inches). Each belt 71 is provided on the inner side (the side facing the wheel axles in the installed state) with a large number of teeth or cams 72 arranged in the center of the width of the belt in a row extending in the direction of length of the belt 71. Each of the cams 72 has the shape of a truncated pyramid, the larger end surface of which is located on the inner boundary surface of the belt 71. The dimensions of the cams 72, as shown in the elevational view of FIG. 9, are adapted to the shapes of the sides of the tires of the wheels surrounded by tracks 70 and they are chosen so that the cams 72 are held with a clamping fit between two neighboring tires. Viewed in the direction of length of the belt 71, the cams 72 are spaced apart by a distance of about one hundred millimeters (4 inches). On the outer side of the bolt 71 (the side contacting the ground in the installed state) transverse ribs 73 cover the whole width of the belt 71; as seen in side elevation (FIG. 8) they have a trapezoidal shape. The transverse ribs 73 are spaced apart by a distance of about one hundred millimeters (4 inches). The pitches of the transverse ribs 73 and the cams 72 are equal to one another. The belt 71, the cams 72 and the transverse ribs 73 are integral with one another. Optionally, a liner 71a of nylon, canvas or the like may be included in the inner surface of belt 71.

Near the two ends of each of the endless tread track parts, the belt 71 is provided, viewed in plan, with a rim which is milled so that the two ends of 70 track, or of two track parts, interengage as is shown in FIG. 9. The milled end rims of the two parts are formed by, viewed in plan, alternating rectangular extensions 74 and cavities 75. Viewed in side elevation, each extension 74 forms a thickened part of the belt 71 (FIG. 8) and has on the outer side also parts of a transverse rib 76. Each extension 74 has a square hole 77 in the flexible material, which hole extends at right angles to the direction of length of the belt 71 and passes right through the extension 74 so that, when the extensions 74 and the cavities 75 of two joined belt parts inter-engage, the registering holes 77 form substantially uninterrupted channel extending throughout the width of the belt parts. In each hole 77 is fastened a separate length of tubing 78 by vulcanization or casting of the material to cover the whole width of the extension 74 concerned. Each tubing 78 has, in this embodiment, a sqaure cross-section and the outer surfaces of the tubing are in contact with the inner surfaces of the hole 77 concerned. When the extensions 74 and the cavities 75 are intermeshing in the manner shown in FIG. 9, the tubings 78 form a substantially uninterrupted channel. Through the tubings 78 is passed a spring steel rod 79, the length of which is equal to the width of the belt parts 71. The rod 79 is solid and has boundary surfaces which closely fit the inner surfaces of the hollow tubings 78. The rod 79 is thus closely surrounded by the tubings 78 which, in turn, are rigidly secured to the belt parts 71. A non-pivotable joint is thus provided between the belt parts 71. The tubings 78 and the co-operating rod 79 may have a different cross-section, for example, they may be rectangular or hexagonal.

In one of the walls of one of the tubings 78, preferably the tubing in an extension 74 that is located on one side of a belt part 71, a cavity 80 is provided on the inner side of the tubing for receiving, in the installed state, a locking pin 81 provided in the rod 79. For this purpose the rod has a cylindrical cavity 82 holding a spring 83, which urges the locking pin 81 outwardly through a bore communicating with the cavity 82 so that the tip of the locking pin can emerge from the rod 79. The center lines of the locking pin 81, the cavity 82 and the spring 83 are at right angles to the direction of length of the rod 79. Near the end thereof adjacent to the locking pin 81, the rod 79 is provided with a rigidly secured pin 84 which projects from one side of the rod. The longitudinal axis of the pin 84 is at right angles to that of the locking pin 81. In the corresponding tubing 78, one of the walls has a V-shaped notch 85 starting from the end face of the tubing 78 located on the outer surface of the belt parts 71. In the installed state, the end of the pin 84 snaps into the notch 85 of the tubing 78. The parts 78, 79 constitute a joint 86 between two endless tread track parts. Track 70 in this embodiment comprises two parts interconnected in a non-pivotable, substantially rigid manner by two joints 86 but, as an alternative, track 70 may be formed by a single part the ends of which are interconnected by a single joint 86 and, as a further alternative, the track 70 may be formed by more than two parts which may be interconnected by more than two joints 86.

It should be noted that the track 70 of FIGS. 1 to 7 is shown surrounding the vehicle ground wheels so that these Figures illustrate the track 70 in its operative position, but the vehicles shown may, of course, also be employed without the tracks 70.

An endless tread track according to the invention may, of course, also be employed in vehicles other than those mentioned above, which are equipped in the factory with pairs of tired wheels on each side of the vehicle, for example, motor cars, tractors or soil cultivating machines, the latter being equipped, for example, with grippers or cranes. In order to arrange an endless tread type track on such vehicles and also on those shown in FIGS. 1 to 7, the hydraulic cylinders 35 (FIGS. 1 to 5) and 67 (FIGS. 6 and 7) are energized from the Jriver seat so that the pressure plate 32 or 64 turns about the center line of the pipe 25 or 63 down to the ground. When the pressure plate 32 or 64 is pressed hard against the ground by means of the cylinders 35 or 67 so that part of the weight of the vehicle is evenly distributed across the comparatively large surface of the pressure plate, the rear part of the vehicle can be lifted from the ground.

The two parts of each caterpillar track 70 will have been previously connected by means of one joint 86. For this purpose the extensions 74 and the cavities 75 at the area of the joint 86 of the endless tread track parts are fitted to one another so that the tubings 78 form a single substantially uninterrupted hole through which the rod 79 is passed so that the caterpillar track parts become interconnected. The rod 79 is inserted in a given position into the tubings 78 so that the locking pin 81 projecting from the rod 79 slides along the inner wall of the tubing 78 where the cavity 80 is provided. When the pin 84 of the rod 79 snaps into the notch 85, the locking pin 81 just snaps into the cavity 80. Since the pin 84 projects from only one side of the rod 79 and the notch 85 is provided in only one wall of the tubing 78, the lockng pin 81 will snap with certainly into the cavity 80 when the pin 84 engages the notch 85. In this way, the rod 79 is prevented from moving in an axial direction with respect to the two track parts during operation.

The two endless track parts, having each a length of about 250 centimeters (98½ inches) and being intercoupled so far by only one joint 86 are put on the ground beneath the sets of raised wheels 3, 11 or 45, 57 so that at least a number of the row of teeth or cams 72 are located beneath the gap between two tires located side by side. This disposition of tracks 70 beneath the sets of consecutive wheels is, of course, performed on both sides of the vehicle.

Subsequently, the hydraulic cylinders 35 or 67 are actuated so that the pressure plates 32 or 64 are moved upwardly into the positions shown in the Figures. The wheels 3, 11 or 45 and 57 are lowered onto tracks 70 lying on the ground, while a number of the cams 72 penetrate in between two neighboring tires. The further parts of tracks 70 are then passed manually upwardly around the sets of wheels, the free ends being approached as closely as possible to one another. In the meantime, or beforehand, the hydraulic cylinders 40 or 60 are actuated so that the wheel axle 23 or 50 is moved towards the axle of the wheels 3 or 44 lying in front thereof. The rods 28 or 53 therefor slide forwardly through the plates 29 or 55 and the already compressed springs 31 or 56 are further compressed. Since the wheel sets 11 or 57 are nearer the wheel sets 3 or 45, the second joint 86 can be readily established manually because track 70, in this position, has an excess of length. The second joint 86 is established in exactly the same manner as the first joint 86.

Subsequently, the hydraulic fluid pressure in the cylinders 40 or 60 is eliminated so that the springs 31 or 56 urge the arms 20 or 48, and hence the wheel sets 11 or 57, back into the positions shown in FIGS. 4 and 7 so that track 70 is tensioned in the desired manner and is settled correctly with respect to the sets of wheels. During operation, tracks 70 are constantly kept taut by the springs 31 or 56.

Figure 3:
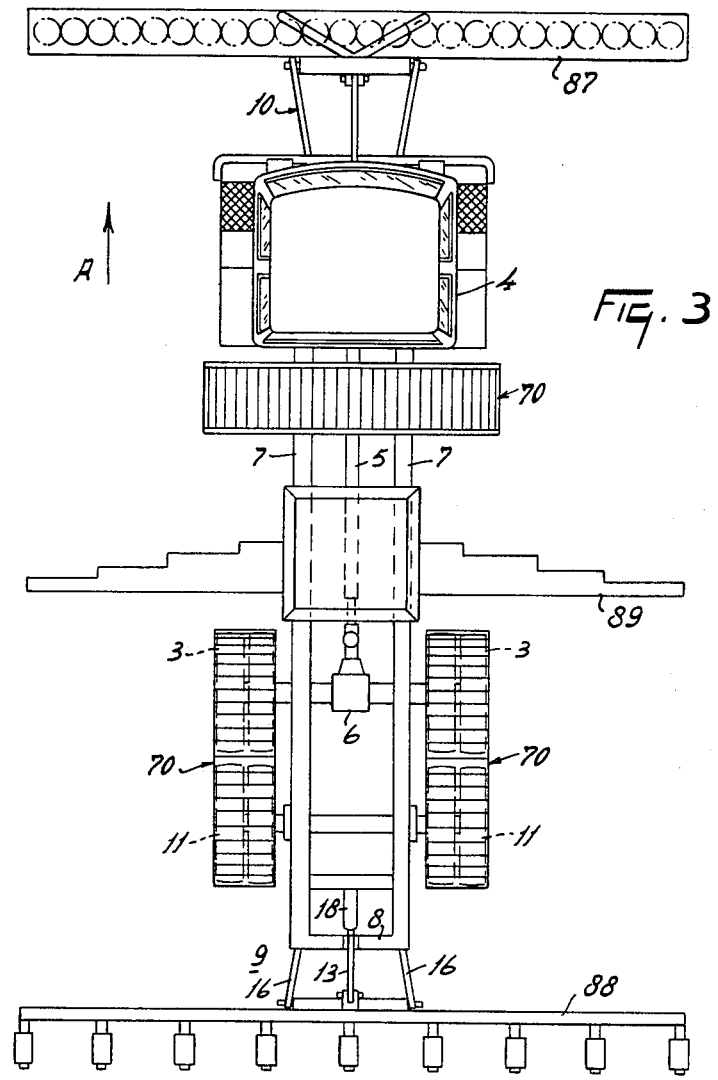
FIG. 3 is a plan view of the truck of FIGS. 1 and 2 employed for agricultural purposes.

If tracks 70 are no employed, they can be stored in a folded state at a place between two of the supports 38 or 47 as is illustrated in FIGS. 1, 3 and 6, the folded tracks 70 then extending transversely of the direction of movement A and bearing on the frame beams 7 or 42. When the vehicle runs directly on the tires of the wheels 3, 11 or 45, 57, the aforesaid stops on the free ends of the rods 28 or 53 come into contact with the plates 29 or 55 so that the springs 31 or 56 cannot urge the rods out of the holes in said plates. The additional wheels 11 or 57 are then connected with the frame so as to be bodily pivotable against resilient opposition.

It will be obvious tracks 7o according to the invention may also be arranged on wheels of dissimilar diameters.

The flexible tread type tracks of the construction described above can always be applied or removed easily owing to their low weight. Owing to the combination of the flexible caterpillar tracks with tires, a vehicle equipped with such tracks may be used on roads without causing damage thereto. Tracks 70 according to the invention may also be employed as members to replace snow and other non-skid chains.

Owing to the provision of the caterpillar tracks, the driven wheels have a high tractive force as a result of the large ground contact surface and of the large number of transverse ribs 73 while, at the same time the ground contact pressure is reduced to a low value so that the risk of sinkage of the vehicle is very slight.

Since the flexible type endless tread tracks are free of hinges, the wear is very slight, whereas the lifetime is long. If desired, tires normally having a low rolling resistance on the road or on solid soil may be employed. In conjunction with tracks 70 the rolling resistance on weak soil is also slight.

Since standard trucks are mass-produced in large numbers and their cost of manufacture is, therefore, comparatively low, it is economically satisfactory to equip them with readily removable and storable tracks 70 according to the invention, since the field of use can thus be extended to agriculture. The truck shown in FIG. 3 may be equipped by means of the foremost lift 10 with, for example, a rotary harrow 87 and by means of the hindmost lift 9 with for example seed drill 88. If desired, when the loading trough 37 is removed, another tool, for example, a fertilizer distributor 89 may be mounted on the tops of the frame beams 7, which may be provided with coupling means about midway along the length of the vehicle.

The invention is not necessarily limited to the statements made in the foregoing description or in the following claims or both, but also may be directed to details of the Figures whether described or not described.

I claim:

1. A vehicle included in the group which comprises tractors, motorcars, soil cultivating machines, trucks, wagons and the like, said vehicle comprising a frame and at least two pairs of aligned wheels, one said pair on each side of the vehicle, each said wheel comprising at least one pneumatic tire, each said pair of wheels being mounted in tandem, at least one of said wheels in each said pair of wheels being driven and having its axis in a fixed position relative to said frame, at least one removable track selectively received around each said pair of wheels, means for selectively rapidly removing and installing said track around each pair of said wheels including a hydraulically operable device for selectively shortening the distance between said wheels sufficiently to permit installation of each said track around the corresponding pair of said wheels, resilient means which is operatively coupled with said device biased for lengthening the distance between each said pair of wheels thereby tensioning the corresponding said track, and a single actuable lifting means for lifting both pairs of wheels from the ground simultaneously, said lifting means centered between said pairs of wheels as seen from the rear.

2. A vehicle according to claim 1, wherein said track is maintained in tension by said resilient means comprising a spring during operation of said vehicle.

3. A vehicle according to claim 1, wherein an axle for one of said wheels not in a fixed position is pivotable about an axis located at a distance from that wheel axle.

4. A vehicle according to claim 1, wherein said lifting means comprises a plate extending over the width of said frame and being pivotable at one end relative to said frame about a horizontal axis transverse to the vehicle's longitudinal axis which is adapted to be moved up and down.

5. A vehicle according to claim 4, wherein said lifting means comprises a hydraulically actuable lifting device.

6. A vehicle according to claim 1, wherein a lift for attaching an agricultural implement is provided at both the front and the rear of said vehicle.

7. A vehicle according to claim 1, wherein coupling points for an agricultural machine are provided at the sides of said vehicle.

8. A vehicle according to claim 1, wherein said vehicle defines a storage space for said track, said storage space being defined beneath a loading platform provided for said vehicle.

9. A vehicle according to claim 1, wherein said lifting means comprises a member arranged symmetrically to a longitudinal plane of substantial symmetry of said vehicle, said member being adapted to be pressed against the ground from the frame provided in said vehicle.

10. A vehicle comprising a frame, a loading platform mounted on said frame and two groups of ground wheels, one said group on each lateral side of said platform, wherein said vehicle also comprises two tracks, each track removably arranged around one said group of ground wheels comprising at least two tandem like side-by-side pairs of ground wheels, one said pair of ground wheels of each said group having an axis of rotation in a fixed position relative to said frame and the other of said ground wheels of said group having an axis of rotation which is movable in a substantially horizontal direction relative to said frame, each said ground wheel comprising a pneumatic tire, each said pair of ground wheels being coaxial, the width of said track being substantially equal to the combined width of each pair of said side-by-side ground wheels, means for rapidly installing and removing each said track from its corresponding group of ground wheels which comprises first means for shortening the distance between said two pairs of ground wheels in each said group whereby the corresponding said track can be installed or removed and second means operatively connected with said first means for lengthening the distance between said two pairs of ground wheels of said corresponding group wherein its said track is placed in a state of tension and the actuable lifting means for lifting groups of ground wheels at substantially the same time, said lifting means centered between said groups of ground wheels as seen from the rear.

11. In combination with an agricultural vehicle having a pair of rear wheels with pneumatic tires thereon in tandem on each side thereof which are adapted to receive a removable endless track which connects each said pair of wheels whereby it extends around said pair of tires and moves therewith, one actuable means for simultaneously lifting said tires above the underlying ground, said lifting means centered between said pairs of wheels as seen from the rear and comprising pivot means mounted on the frame of said vehicle forward of at least one of said tires, a pressure plate for bearing the weight of the rear part of the vehicle which is slightly curved as seen from the side pivotally connected to said pivot means at its forward end, said pressure plate having a width substantially equal to said vehicle frame whereby the rear part of the weight of the vehicle is evenly distributed across a comparatively large surface of said pressure plate when the rear part of the vehicle is supported thereby, selectively powered extensible means connected to said pressure plate near its rear end, said extensible means adapted to cause said pressure plate to be pressed against the ground between said wheels and simultaneously lift said wheels whereby said tires mounted thereon can be raised above the ground sufficient to permit the rapid installation or removal of said tracks, the rearmost of said wheels being connected to the frame of said vehicle so as to be movable within limits forward and rearward relative to said frame by an amount sufficient to permit rapid removal or installation of said endless track, resilient means cooperating with said frame whereby said rearmost wheels are biased to the rear relative to said frame.

12. A vehicle according to claim 11, wherein said resilient means comprises compression springs.

13. A vehicle according to claim 11, wherein power means is provided to move said rearmost wheels forward relative to said frame against the biasing of said resilient means wherey said tracks may be installed or removed from around said tires.

14. A vehicle according to claim 13, wherein said power means comprises at least one hydraulic piston and cylinder assembly which is pivotally connected to said frame.

15. A vehicle according to claim 14, wherein a single hydraulic and cylinder assembly is provided which is disposed on the longitudinal axis of said vehicle as seen in plan.

16. An arrangement of two groups of wheels, one group on each side of a vehicle, each said group comprising a pair of wheels in tandem with ground engaging pneumatic tires thereon which are adapted optionally to receive an endless removable ground engaging track resiliently mounted around the tires on said wheels and to rotate therewith, said arrangement of each said group comprising a wheel carrier pivotably connected to the frame of said vehicle and depending downwardly therefrom, one of said wheels in each pair being mounted on said carrier, the other of said wheels in each said pair having its axis of rotation in a fixed position relative to said frame, and means for rapidly installing and removing said tracks from said pairs of wheels comprising resilient means mounted between said frame and said carrier urging said one wheel of each said pair away from said other wheel, power means coupled to said resilient means mounted between said frame and said carrier for selectively moving said one wheel of each said pair towards said pair's other wheel and one actuable lifting means centered between said groups of wheels as seen from the rear whereby said track is adapted to be installed or removed from around said tires.

17. An arrangement according to claim 16, wherein said resilient means comprises a compression spring.

18. An arrangement according to claim 16, wherein said power means comprises a hydraulic piston and cylinder.

19. An arrangement according to claim 16, wherein said vehicle includes a motor and only said other wheel is driven directly by said motor.

20. A vehicle of a type included in the group which comprises tractors, motorcars, soil cultivating machines, trucks, wagons and the like, said vehicle having on each side a set of at least two ground wheels which each include at least one pneumatic tire and are disposed in tandem whereby tires on each side are located one behind the other, an engine operatively connected to drive at least two of said ground wheels, tracks for selective arrangement around each set of said ground wheels disposed in tandem, each said track comprising a readily disconnectible connection between opposite ends whereby when so connected it comprises an endless tread, means for rapidly selectively removing said tracks from their arrangement around said sets of ground wheels and for arranging said tracks around said sets of ground wheels respectively, said means comprising only one actuable lifting device adapted to lift both said sets of ground wheels from the ground at each side of the vehicle, said lifting device being centered between said sets of ground wheels as seen from the rear, said lifting device comprising a plate which is pivotally connected to a frame included in the vehicle, said plate having a width spanning the major portion of the transverse distance between said ground wheels and a relatively large surface for contacting the underlying ground whereby the weight of the vehicle normally supported by said ground wheels is evenly distributed across said large surface, and means for decreasing the distance between said wheels in each set of ground wheels a sufficient amount for providing rapid installation or removal of said tracks while opposite ends are connected.

21. A vehicle in accordance with claim 20, including means for tensioning each of said tracks operatively coupled to said means for decreasing the distance between said axles.

22. A method of rapidly installing and removing endless tracks around and from two pairs of adjacent longitudinally aligned wheels which each mount pneumatic tires of a vehicle having one said pair of said wheels on each side, the method comprising the steps of:

simultaneously lifting both said pairs of wheels from the ground by a single actuable lifting means in said vehicle, said lifting means bearing on the ground centered between said wheels as seen from the rear;

selectively shortening the distance between said wheels of each said pair of wheels by a hydraulically operable device in said vehicle sufficiently to permit the installation of an endless track around each said pair of wheels;

installing an endless track around each said pair of wheels over the pneumatic tires mounted thereon and lengthening the distance between each said pair of wheels by resilient biasing means in said vehicle thereby tensioning each said track around its corresponding pair of wheels;

moving the vehicle on said tracks and thereafter simultaneously lifting both said pairs of wheels from the ground by said lifting means;

selectively shortening the distance between the wheels of each said pair of wheels by said hydraulically operable device;

removing said tracks from said wheels; and lengthening the distance between each said pair of wheels by said biasing resilient means and lowering said wheels to the underlying surface whereby the vehicle may be moved with said pneumatic tires in direct contact with the underlying supporting surface.

23. A method in accordance with claim 22, wherein said lifting means comprises a pressure plate having a relatively large surface which is so constructed and arranged that the weight of the vehicle carried by said pairs of wheels is evenly distributed across a comparatively large surface between said pairs of wheels when said pairs of wheels are simultaneously lifted by said lifting means.

24. A method in accordance with claim 23, wherein the the width of said plate spans the major portion of the transverse distance between said pairs of wheels when said pairs of wheels are simultaneously lifted by said lifting means.

25. A method in accordance with claim 24, wherein said plate pivots during the step of lifting said pairs of wheels from a location on said vehicle forward of said pairs of wheels as seen from the side.

26. A method in accordance with claim 24, wherein said plate pivots during the step of lifting said pairs of wheels from a location between said wheels of each said pair as seen from the side.

27. A method in accordance with claim 22, wherein the rear wheel of each said pair of wheels is moved forwardly by said hydraulic operable device and rearwardly by said resilient biasing means.

* * * * *